(12) United States Patent
Yam et al.

(10) Patent No.: US 12,430,315 B2
(45) Date of Patent: Sep. 30, 2025

(54) SYSTEM, METHOD, AND DEVICE FOR UPLOADING DATA FROM PREMISES TO REMOTE COMPUTING ENVIRONMENTS

(71) Applicant: The Toronto-Dominion Bank, Toronto (CA)

(72) Inventors: Andrew Kai Ming Yam, Mississauga (CA); Adrian Ariel Ionescu, Vaughan (CA); Upal Sayeed Hossain, Toronto (CA); George Knapp, Mullica Hill, NJ (US)

(73) Assignee: The Toronto-Dominion Bank, Toronto (CA)

( * ) Notice: Subject to any disclaimer, the term of this patent is extended or adjusted under 35 U.S.C. 154(b) by 21 days.

(21) Appl. No.: 17/813,804

(22) Filed: Jul. 20, 2022

(65) Prior Publication Data

US 2024/0028581 A1 Jan. 25, 2024

(51) Int. Cl.
G06F 15/16 (2006.01)
G06F 16/21 (2019.01)
G06F 16/23 (2019.01)

(52) U.S. Cl.
CPC ........ *G06F 16/2358* (2019.01); *G06F 16/211* (2019.01); *G06F 16/2365* (2019.01)

(58) Field of Classification Search
None
See application file for complete search history.

(56) References Cited

U.S. PATENT DOCUMENTS

| | | | |
|---|---|---|---|
| 8,751,525 B2 | 6/2014 | Kaufmann et al. | |
| 10,803,031 B1* | 10/2020 | Wilton | G06F 16/214 |
| 10,817,540 B2 | 10/2020 | Cruanes et al. | |
| 10,977,244 B2 | 4/2021 | Grabs et al. | |
| 10,997,151 B2 | 5/2021 | Muralidhar et al. | |
| 11,055,280 B2 | 7/2021 | Huang et al. | |
| 11,106,658 B2 | 8/2021 | Cseri et al. | |
| 11,120,899 B1* | 9/2021 | Rai | G06F 40/295 |
| 11,379,439 B1* | 7/2022 | Bengoa | G06F 16/24554 |

(Continued)

OTHER PUBLICATIONS

US 10,776,340 B2, 09/2020, Cseri et al. (withdrawn)

(Continued)

*Primary Examiner* — Alex Gofman
(74) *Attorney, Agent, or Firm* — CPST Intellectual Property Inc.; Brett J. Slaney

(57) ABSTRACT

A device, method and system for loading data into a remote computing environment is disclosed. The method includes receiving a request to load a new data set into a remote computing environment, the new data set impacting a data set stored thereon. The method includes identifying one or more changes to a current representation of the data set within the new data set, the one or more changes replacing information in the current representation. The method includes transmitting the identified one or more changes to a data store persisting the current representation. The method includes transmitting the replaced information to a data store persisting a previous representation of the data set. The method includes transmitting other information in the new data set that is determined to be invalid data to a data store persisting an invalid data set associated with the data set.

20 Claims, 14 Drawing Sheets

(56) References Cited

U.S. PATENT DOCUMENTS

| | | | |
|---|---|---|---|
| 2009/0144146 A1* | 6/2009 | Levine | H04L 9/3297 |
| | | | 705/26.1 |
| 2012/0011176 A1* | 1/2012 | Aizman | G06F 16/183 |
| | | | 707/822 |
| 2014/0040182 A1* | 2/2014 | Gilder | G06F 16/256 |
| | | | 707/602 |
| 2014/0281307 A1* | 9/2014 | Peterson | G06F 11/1402 |
| | | | 711/162 |
| 2014/0330875 A1* | 11/2014 | Gulamali | G06F 16/182 |
| | | | 707/827 |
| 2015/0019488 A1* | 1/2015 | Higginson | G06F 16/214 |
| | | | 707/634 |
| 2016/0063001 A1* | 3/2016 | Scriffignano | G06F 40/194 |
| | | | 707/749 |
| 2021/0200744 A1* | 7/2021 | Gubba | G06F 16/2365 |
| 2023/0176761 A1* | 6/2023 | Biezuner | G06F 16/2272 |
| | | | 711/154 |
| 2023/0176960 A1* | 6/2023 | Shrestha | G06F 9/44505 |
| | | | 717/124 |

OTHER PUBLICATIONS

Armbrust, Michael et al.; Delta lake; high performance ACID table storage over cloud object stores; Proceedings of the VLDB Endowment (vol. 13, Issue 12) pp. 3411-3424, Aug. 1, 2020; https://databricks.com/jp/wp-content/uploads/2020/08/p975-armbrust.pdf.

* cited by examiner

SYSTEM, METHOD, AND DEVICE FOR UPLOADING DATA FROM PREMISES TO REMOTE COMPUTING ENVIRONMENTS

TECHNICAL FIELD

The following relates generally to methods of transferring data from premises into remote computing environments.

BACKGROUND

Enterprises increasingly rely upon remote, and possibly distributed, computing environments (e.g., in the cloud), as compared to local computing resources within their control (alternatively referred to as on-premises or on-prem resources), to implement their digital infrastructure. To transition from on-premises to remote computing can require implementing a framework to migrate potentially vast amounts of data regularly for existing operations, or to migrate potentially vast amounts of legacy data. Adding to the challenge, the data being uploaded can be heterogeneous, and uploaded from various applications depending on the existing local computing resource.

Implementing a framework for migrating local data to a remote computing environment, which is at least one of fast, efficient, accurate, robust, and cost-effective is desirable.

BRIEF DESCRIPTION OF THE DRAWINGS

Embodiments will now be described with reference to the appended drawings wherein.

DETAILED DESCRIPTION

Figure 1:
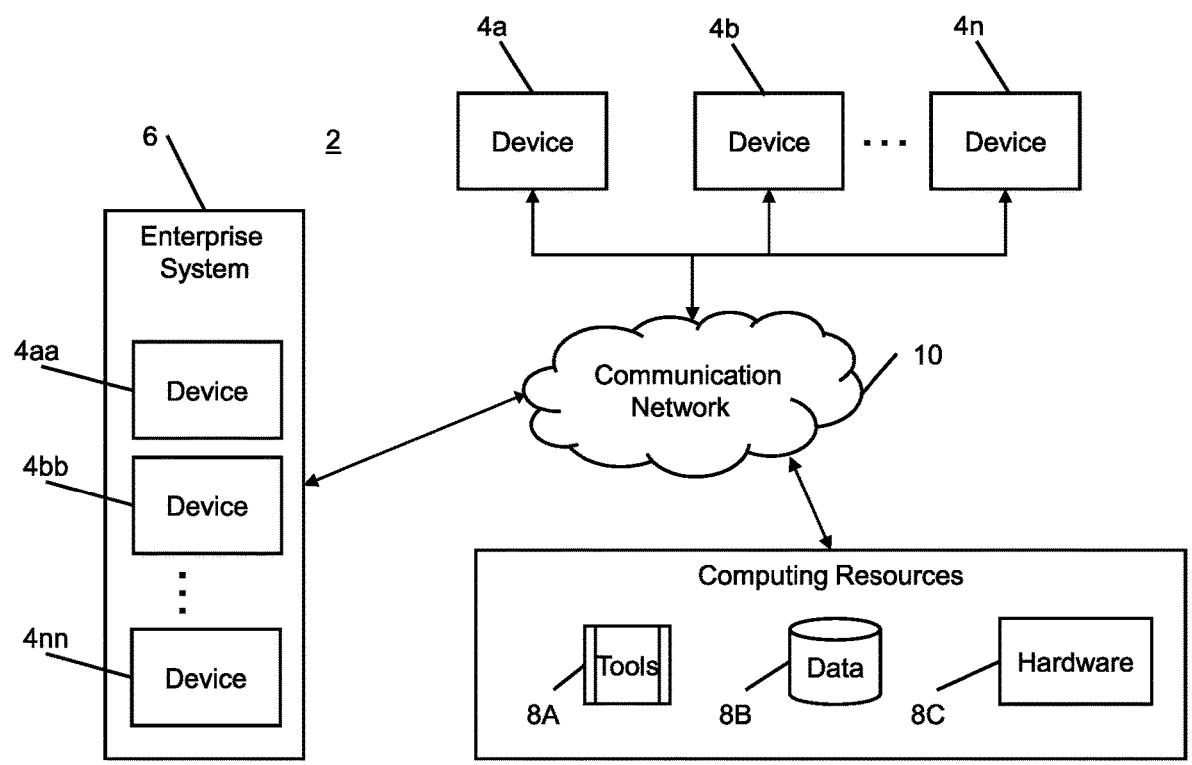
FIG. 1 is a schematic diagram of an example computing environment.

It will be appreciated that for simplicity and clarity of illustration, where considered appropriate, reference numerals may be repeated among the figures to indicate corresponding or analogous elements. In addition, numerous specific details are set forth to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

The following generally relates to a framework for uploading data into a remote (e.g., cloud-based) computing environment. The remote computing environment cooperates with the on-premises environment to store data being ingested in one of a current representation, a previous representation, and an invalid database including invalid data. The on-premises data being ingested can first be compared to an existing current representation of the data, and one or more changes can be identified. Only the changes can be transmitted or queued for updating the current representation, and other data transmitted from the premises to the remote computing environment can be ignored or dropped to save transmission bandwidth, processing resources, and/or storage fees. The changes can be identified by applications on the remote computing environment, to avoid any latency introduced by manipulating data on a local (less capable) machine, or to avoid latency introduced by the transmission of data. In at least some example embodiments, the changes are determined on-premises.

The changes are implemented on the current representation, and any data replaced as a result thereof can be transmitted to the previous representation of the dataset. In this manner, the generation of new "versions" of data can be avoided, as can any associated duplication, as the previous data stored can be retrieved from the previous representation.

The data can be processed so that all data stored on the remote computing device is standardized. This standardization can allow for a data schema used to store the data to evolve over time. For example, a schema for storing the current representation can be changed to reflect the addition of a new column of data. In another example, the current representation can simply incorporate a new dimension so long as the dimension satisfies the schema. For example, new encryption protocols can be implemented without creating a new version of the current representation.

The disclosed approach may be able to upload data for storage on the remote computing environment in a manner that is faster, more efficient, more accurate, more robust, or more cost-effective.

In one aspect, a device for loading data into remote computing environments is disclosed. The device includes a processor, a communications module coupled to the processor, and a memory coupled to the processor. The memory stores computer executable instructions that when executed by the processor cause the processor to receive a request to load a new data set into a remote computing environment, the new data set impacting a data set stored thereon, and identify one or more changes to a current representation of the data set within the new data set, the identified one or more changes replacing information in the current representation associated with the identified one or more changes with the identified one or more changes. The instructions cause the processor to transmit the identified one or more changes to a data store persisting the current representation, and to transmit the replaced information to a data store persisting a previous representation of the data set. The instructions cause the processor to transmit other information in the new data set that is determined to be invalid data to a data store persisting an invalid data set associated with the data set.

In example embodiments, instructions cause the processor to extract an entry in the new data set corresponding to a new dimension to add to the data set, and to transmit the entry to the data store persisting the current representation, the entry being stitched into the current representation of the data set. The data set can associated with a schema, and the new dimension satisfies a new schema replacing the schema.

In example embodiments, the instructions cause the processor to receive a schema change for the data set, and update the current representation of the data set to adhere to the schema change without generating a new version of the current representation.

In example embodiments, the instructions cause the processor to ignore data within the new data set designated as unchanged data.

In example embodiments, the new data set is a snapshot data set.

In example embodiments, the new data set is a delta data set, and all data within the new data set is identified as the one or more changes.

In example embodiments, the instructions cause the processor to receive a request to load an initial data set native to a first data format into the remote computing environment, and to format the native data set into the data set based on a change configuration for converting data in the first data format into another format accepted by the remote computing environment.

In example embodiments, the new data set is standardized in accordance with a configuration file prior to being used to replace information in the current representation.

In example embodiments, the data store persisting the current representation, the previous representation, and the invalid data set is a storage layer of the remote computing environment.

In example embodiments, the one or more changes are identified by the device, and the storage layer is hosted by another remote computing server.

In example embodiments, the current representation, the previous representation, and the invalid data set are stored in a segregated zone of the remote computing environment.

In another one aspect, the method for loading data into remote computing environments is disclosed. The method includes receiving a request to load a new data set into a remote computing environment, the new data set impacting a data set stored thereon. The method includes identifying one or more changes to a current representation of the data set within the new data set, the one or more changes replacing information in the current representation. The method includes transmitting the identified one or more changes to a data store persisting the current representation. The method includes transmitting the replaced information to a data store persisting a previous representation of the data set. The method includes transmitting other information in the new data set that is determined to be invalid data to a data store persisting an invalid data set associated with the data set.

In example embodiments, the method further includes extracting an entry in the new data set corresponding to a new dimension to add to the data set, and transmitting the entry to the data store persisting the current representation, the entry being stitched into the current representation of the data set.

In example embodiments, the data set is associated with a schema, and the new dimension satisfies a new schema replacing the schema.

In example embodiments, the method further includes receiving a schema change for the data set, and updating the current representation of the data set to adhere to the schema change without generating a new version of the current representation.

In example embodiments, the method further includes ignoring data within the new data set designated as unchanged data.

In example embodiments, the new data set is a snapshot data set

In example embodiments, the new data set is a delta data set, and all data within the new data set is identified as the one or more changes.

In another aspect, non-transitory computer readable medium for loading data into a remote computing environment is disclosed. The computer readable medium (CRM) includes computer executable instructions for receiving a request to load a new data set into a remote computing environment, the new data set impacting a data set stored thereon. The CRM includes instructions for identifying one or more changes to a current representation of the data set within the new data set, the identified one or more changes replacing information in the current representation associated with the identified one or more changes with the identified one or more changes. The CRM includes instructions for transmitting the identified one or more changes to a data store persisting the current representation. The CRM includes instructions for transmitting the replaced information to a data store persisting a previous representation of the data set. The CRM includes instructions for transmitting other information in the new data set that is determined to be invalid data to a data store persisting an invalid data set associated with the data set.

Referring now to FIG. 1, an exemplary computing environment 2 is illustrated. In the example embodiment shown, the computing environment 2 includes an enterprise system 6, one or more devices 4 (shown as devices 4a, 4b, . . . 4n, external to the enterprise system 6, and devices 4aa, 4bb, and 4nn, internal to the enterprise system 6), and a remote computing environment 8 (shown individually as tool(s) 8A, database(s) 8B, and hardware 8C). Each of these components can be connected by a communications network 10 to one or more other components of the computing environment 2. In at least some example embodiments, all the components shown in FIG. 1 are within the enterprise system 6.

The one or more devices 4 may hereinafter be referred to in the singular for ease of reference. An external device 4 can be operated by a party other than the party which controls the enterprise system 6; conversely, an internal device 4 can be operated by the party in control of the enterprise system 6. Any device 4 can be used by different users, and with different user accounts. For example, the internal device 4 can be used by an employee, third party contractor, customer, etc., as can the external device 4. The user may be required to be authenticated prior to accessing the device 4, the device 4 can be required to be authenticated prior to accessing either the enterprise system 6 or the remote computing environment 8, or any specific accounts or resources within computing environment 2.

The device 4 can access information within the enterprise system 6 or remote computing environment 8 in a variety of ways. For example, the device 4 can access the enterprise system 6 via a web-based application, or a dedicated application (e.g., uploading module 912 of FIG. 9), etc. Access can require the provisioning of different types of credentials (e.g., login credentials, two factor authentication, etc.). In example embodiments, each different device 4 can be provided with a unique degree of access, or variations thereof. For example, the internal device 4 can be provided with a greater degree of access to the enterprise system 6 as compared to the external device 4.

Devices 4 can include, but are not limited to, one or more of a personal computer, a laptop computer, a tablet computer, a notebook computer, a hand-held computer, a personal digital assistant, a portable navigation device, a mobile phone, a wearable device, a gaming device, an embedded device, a smart phone, a virtual reality device, an augmented reality device, third party portals, an automated teller machine (ATM), and any additional or alternate computing device, and may be operable to transmit and receive data across communication networks such as the communication network 10 shown by way of example in FIG. 1.

The remote computing environment 8 (hereinafter referred to in the alternative as computing resources 8) includes resources which are stored or managed by a party other than operator of the enterprise system 6 and are used by, or available to, the enterprise system 6. For example, the computing resources 8 can include cloud-based storage services (e.g., database(s) 8B). In at least some example embodiments, the computing resources 8 include one or more tools 8A developed or hosted by the external party, or tools 8A for interacting with the computing resources 8. In at least one contemplated embodiment, the tool 8A (referred to in the singular for ease of reference) is a tool for managing data lakes, and more specifically a tool for scheduling writing to a data lake associated with the Microsoft™ Azure™ data storage and processing platform. Further particularizing the example, the tool 8A can allow a device 4 (e.g., internal device 4aa) to access the computing resources 8, and to configure an ingestion procedure wherein different data files are assigned or otherwise processed within the computing resources 8 based on a configuration file. The tool 8A can be or include aspects of a machine learning tool, or a tool associated with the Delta Lake Storage (ALDS)™ suite, etc. The computing resources 8 can also include hardware resources 8C, such as access to processing capability of server devices (e.g., cloud computing), and so forth.

Communication network 10 may include a telephone network, cellular, and/or data communication network to connect distinct types of client devices. For example, the communication network 10 may include a private or public switched telephone network (PSTN), mobile network (e.g., code division multiple access (CDMA) network, global system for mobile communications (GSM) network, and/or any 3G, 4G, or 5G wireless carrier network, etc.), Wi-Fi or other similar wireless network, and a private and/or public wide area network (e.g., the Internet). The communication network 10 may not be required to provide connectivity within the enterprise system 6 or the computing resources 8, or between devices 4, wherein an internal or other shared network provides the necessary communications infrastructure.

The computing environment 2 can also include a cryptographic server or module (e.g., encryption module 1012 of FIG. 10) for performing cryptographic operations and providing cryptographic services (e.g., authentication (via digital signatures), data protection (via encryption), etc.) to provide a secure interaction channel and interaction session, etc. The cryptographic module can be implemented within the enterprise system 6, or the computing resources 8, or external to the aforementioned systems, or some combination thereof. Such a cryptographic server can also be configured to communicate and operate with a cryptographic infrastructure, such as a public key infrastructure (PKI), certificate authority (CA), certificate revocation service, signing authority, key server, etc. The cryptographic server and cryptographic infrastructure can be used to protect the various data communications described herein, to secure communication channels therefor, authenticate parties, manage digital certificates for such parties, manage keys (e.g., public, and private keys in a PKI), and perform other cryptographic operations that are required or desired for particular applications carried out by the enterprise system 6 or device 4. The cryptographic server may be used to protect data within the computing environment 2 (e.g., including data stored in database(s) 8B) by way of encryption for data protection, digital signatures or message digests for data integrity, and by using digital certificates to authenticate the identity of the users and entity devices with which the enterprise system 6, computing resources 8, or the device 4 communicates, to inhibit data breaches by adversaries. It can be appreciated that various cryptographic mechanisms and protocols can be chosen and implemented to suit the constraints and requirements of the computing environment 2, as is known in the art.

The enterprise system 6 can be understood to encompass the whole of the enterprise, a subset of a wider enterprise system (not shown), such as a system serving a subsidiary or a system for a particular branch or team of the enterprise (e.g., a resource migration division of the enterprise). In at least one example embodiment, the enterprise system 6 is a financial institution system (e.g., a commercial bank) that provides financial services accounts to users and processes financial transactions associated with those financial service accounts. Such a financial institution system may provide to its customers various browser-based and mobile applications, e.g., for mobile banking, mobile investing, mortgage management, etc. Financial institutions can generate vast amounts of data, and have vast amounts of existing records, both of which can be difficult to migrate into a digital and remote computing environment, securely and accurately.

The enterprise system 6 can request, receive a request to, or have implemented thereon (at least in part), a method for uploading data from an on-premises location or framework onto the computing resources 8. For example, the requests may be part of an automated data settlement schema used by the system 6 to maintain data sets within the computing resources 8.

Figure 2:
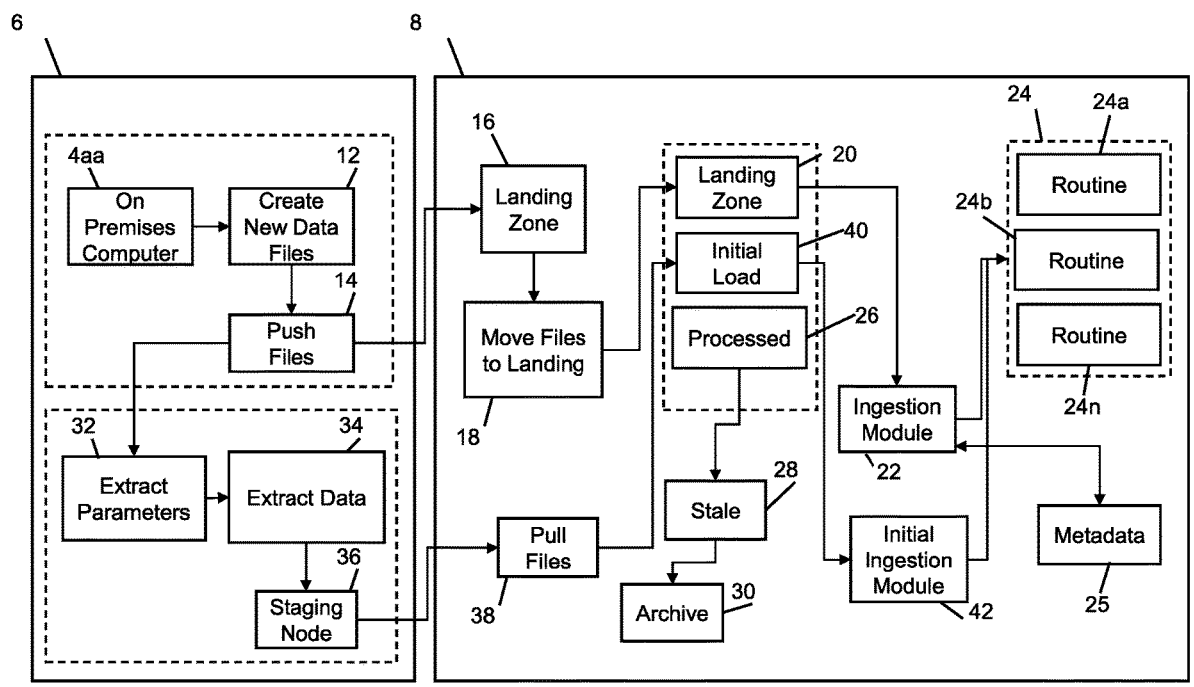
FIG. 2 is a diagram illustrating data moving through a framework for transmitting local data to a remote computing environment.

FIG. 2 is a diagram illustrating data file(s) (hereinafter referred to in the plural, for ease of reference) flowing through a framework for migrating local data files onto a remote computing environment. The disclosed framework may address some of the issues in the discussed existing solutions. In the embodiment shown in FIG. 2, the shown enterprise system 6 is considered to be wholly on-premises, solely for illustrative purposes.

At block 12, an internal device 4aa creates or has stored thereon (or has access to), a set of data files that are to be migrated onto the computing resources 8. For example, the internal device 4aa can be a device operated by an employee to enact a change in a customer bank account within a first application (e.g., generates a data file to open a new bank account). In another example, the internal device 4aa can be operated to change certain login credentials for a banking customer with a second application (e.g., generates a data file to update existing authentication records). In yet another example, the internal device 4*aa* can retrieve and generate data files related to stock trades executed for customers with a third application. The preceding examples highlight the potentially heterogeneous nature of the data files, and the heterogeneous nature of the applications used to generate or manage the data files. It is understood that the preceding examples demonstrate simplified singular instances of generating a data file or data set, and that this disclosure contemplates scenarios involving a set of files being generated (e.g., the number of files generated by a small business, or a large multinational business, and everything in between).

At block 14, the data files are pushed into the computing resources 8. In example embodiments, the block 14 denotes a platform for pushing data into the computing resources 8. For example, a functionality in block 14 may be provided by an application (hereinafter the originating application for pushing data) which (1) retrieves data files from the device 4*aa* for uploading to the computing resources 8, and (2) schedules the pushing of the retrieved data files into the computing resources 8 via available transmission resources. In respect of the retrieval, the originating application may include one or more parameters enabling the originating application to cooperate with various data generating applications. For example, the originating application can include an application programming interface (API) to interact with the data required to be retrieved from an ATM, and to interact with data files required to be retrieved from a personal computing device, etc. The application generating the data files can also be configured to store the data files for uploading within a central repository which is periodically checked by the originating application. In at least some example embodiments, the originating application can be configured to encrypt sensitive data, for example with the cryptographic server or module described herein.

The one or more parameters of the originating application can also control the scheduling of when data files are pushed. For example, the originating application can be configured to push data files periodically. In at least some example embodiments, the originating application can be in communication with another application of the computing resources 8 (e.g., landing zone 16) to coordinate pushing data files from the internal device 4 to the computing resources 8 in instances where the computing resources 8 can process the pushed data files in a timely manner.

In at least some example embodiments, the originating application is implemented on the computing resources 8, and instead of being configured to push data is instead configured to pull data files from the enterprise system 6 into the computing resources 8. For example, the originating application can be an application on the computing resources 8 that periodically checks a central repository on the internal device 4*aa* designated for storage of data files to be uploaded to the computing resources 8.

Transmitted on-premises data arrives in a landing zone 16 within the computing resources 8. The landing zone 16 can be preconfigured to immediately move or reassign the arrived data to the control of another application (hereinafter referred to as the cloud administration application) at block 18. In at least some example embodiments, the cloud administration application and the originating application are different functionalities of a single application.

The landing zone 16 can be configured to store data files temporarily, unless one or more criteria are satisfied. For example, the landing zone 16 can be configured to remove all data files more than 15 minutes old unless the device 4 or user account requesting uploading of the data files is authenticated. In example embodiments, the landing zone 16 requires authentication via an access token procedure. The access token and temporary storage configuration can be used to enforce a time sensitive authentication method to minimize potential damage associated with the risk of the access token being exposed.

Upon satisfactory authentication (e.g., where the device 4*aa* is pre-authenticated, or where the landing zone 16 relies upon authentication administered on the device 4, etc.), the data files stored thereon can be immediately pushed, via block 18, to the landing zone 20. In example embodiments, various scheduling techniques can be employed to move data between the landing zones. For example, data files stored in the landing zone 16 can be transferred to the landing zone 20 only in response to determining, by the cloud administration application, that certain traffic parameters are satisfied. Continuing the example, data files may only be transferred between the landing zones once the landing zone 20 has capacity, or is estimated to have capacity, to process the received data within a time specified by a traffic parameter.

Data files within the landing zone 20 are subsequently transmitted to the ingestion module 22.

The use of multiple landing zones can potentially provide for a robustness within the disclosed framework. For example, less storage infrastructure may be assigned to the first landing zone, where relatively less storage is expected to be required owing to data files being stored on a temporary basis, as compared to the second landing zone. In instances where the second landing zone is closer to the location of processing (e.g., the ingestion module 22), an application can schedule the transmission of data from the first landing zone to the second landing zone to ensure that the second landing zone is not overwhelmed, introducing undesirable latency. In another example, one or more preliminary processes may be implemented on the data files in the first landing zone prior to the data files entering the second landing zone. For example, the first landing zone can be configured to determine whether the transmitted data file includes appropriate template files 46 within the template repository 47.

In example embodiments, greater security infrastructure is assigned to the first landing zone. For example, the landing zone 16 can require authentication and be associated with or have access to infrastructure to implement, for example, an access token scheme.

The ingestion module 22 consumes data files for persistent storage in the computing resources 8 (e.g., the persistent storage denoted by the remote computing environment 24). In at least some example embodiments, the ingestion module 22 can standardize and/or validate data files being consumed, and/or extract metadata related to the request to upload data files for persistent storage. The ingestion module 22 can process the data files being consumed based on a configuration file 23 stored within a metadata repository 25.

At block 32, data files which do not have a configuration file 23 within the computing resources 8, or are previously unknown to the computing resources 8 are processed. The data files from block 12 may be processed to extract one or more parameters related to storing the data on the computing resources 8. For example, the data files can be processed to extract parameters defining the properties of the data file.

Properties can include the number of columns within the data file, the value ranges for each of the entries within a particular column, etc.

Figure 3:
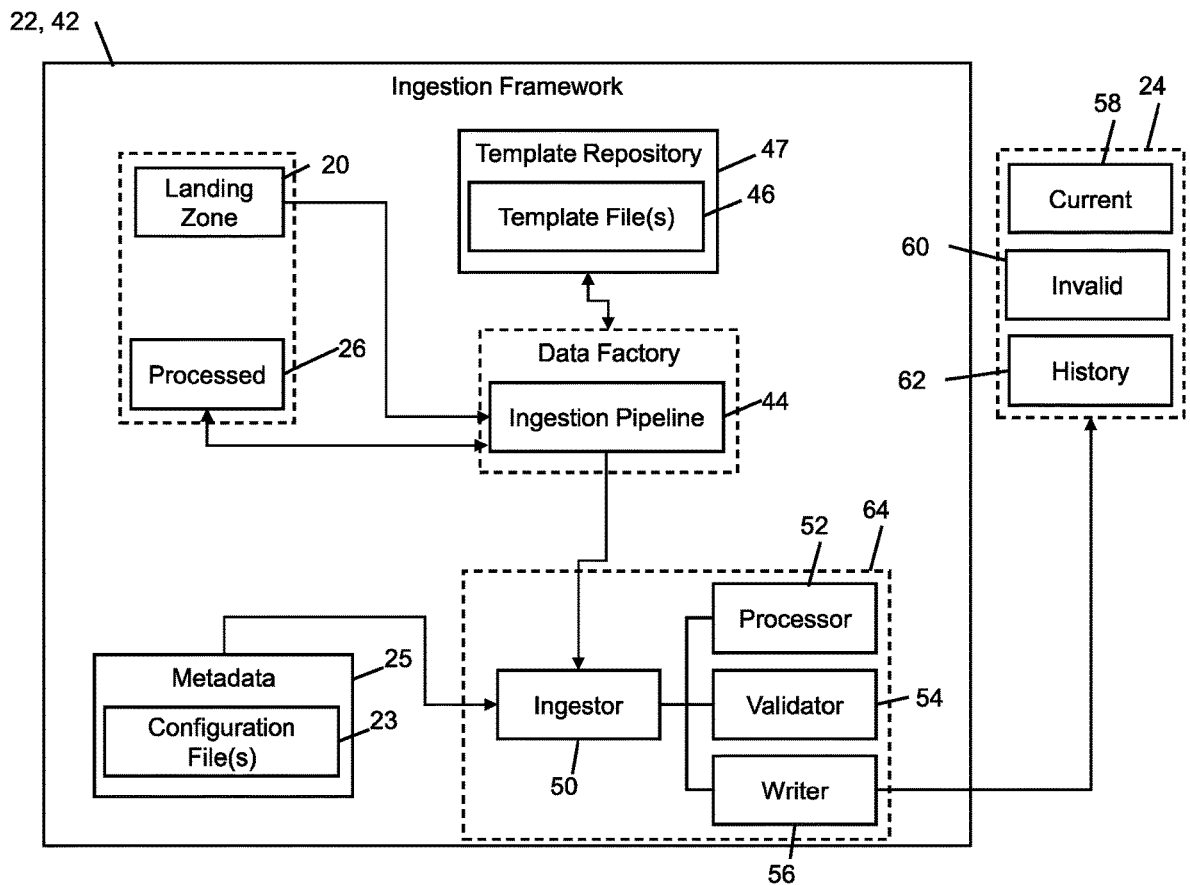
FIG. 3 is a diagram of an example ingestion framework.

Block 32 may require that any data files being uploaded to the computing resources 8 for the first time are accompanied with or include one or more template files 46 for operations (e.g., stored in template repository 47 of FIG. 3).

Block 32 or block 34 can also include a verification step (not shown). For example, the request, or the template file(s) 46, can be reviewed by a developer to ensure that it is consistent with approaches employed by the computing resources 8. It may be that the developer is required to subsequently transfer the configuration file 23 generated from the template file 46 to the metadata repository 25 to initiate the process of storing files on the remote computing environment 8.

At block 34, historical data associated with the data files created or designated for ingestion in block 12 can be extracted. This historical data can include metadata such as the author of the data, the relevant section of the enterprise system 6 with which the data should be associated, the application generating the data, and so forth. In at least some example embodiments, the historical data can include previous versions of, or stale data related to, the new data file being uploaded to the computing resources 8 (e.g., the historical data can include seven years of past data associated with the new data file). For example, the parameters can include stale data comprising previous transactions in a financial institution enterprise system 6.

At block 36, the data processed at blocks 32 and 34 is moved to a staging node or loading zone for uploading to the computing resources 8. In example embodiments, the staging node or loading zone denoted by block 36 includes an originating application like originating application discussed in respect of landing zone 16. For example, computing hardware on the enterprise system 6 may be scheduled to transmit data files for uploading to the computing resources 8 overnight, to reduce load on the enterprise system 6. In another example, the staging or loading zone denoted by block 36 can be configured to first transmit time sensitive information for storage to the computing resources 8. For example, transactions may be given special priority for uploading to the computing resources 8.

Landing zone 38, similar to landing zone 16, receives the data files from block 36 within the computing resources 8.

Landing zone 40, similar to landing zone 20, receives the data files from landing zone 38, and transmits same to an initial ingestion module 42.

Similar to the landing zone 20, an originating application can be used to control the flow of data from the landing zone 40 to the initial ingestion module 42. The initial ingestion module 42, similar to the ingestion module 22, consumes data for persistent storage in the remote computing resources 8 (e.g., in a segregated or separate remote computing environment 24).

Although not shown to maintain visual clarity, data for tracking the flow of data files within the framework (hereinafter tracking data), which tracking data is related to data files that are queued for consumption by the ingestion module 22 or the initial ingestion module 42, can be stored on the computing resources 8. In example embodiments, the tracking data includes at least one of metadata related to the data files (e.g., creating date, originating application, etc.), data related to the requests to upload the data file (e.g., time of request, originating system, etc.), parts of the data file (e.g., entries, hash values of individual data files, etc.), or some combination thereof.

The tracking data can be stored in a variety of ways. In at least one contemplated example embodiment, transmitting the data files to the ingestion module 22 can trigger the tracking data to be sent to the processed database 26. Tracking data within the processed database 26 can be stored only for a predefined amount of time (e.g., 30 days), after which it is sent to the stale database 28, and after a predefined amount of time (e.g., one year), the stale database 28 or controller associated therewith can migrate data into an archive 30. In at least some contemplated example embodiments, the tracking data can be provided to the template repository 47 for storage. In example embodiments, the processed database 26, the stale database 28, and the archive 30 are aspects of the template repository 47.

FIG. 3 shows a diagram of an example ingestion framework, being either the ingestion module 22 or the initial ingestion module 42 (hereinafter discussed predominantly in respect of ingestion module 22, for simplicity).

In FIG. 3, the landing zone 20 and the processed database 26 are shown as within the ingestion module 22, as is the metadata repository 25. It is understood that the shown configuration is illustrative (e.g., a different configuration is shown in FIG. 2 where the landing zone 20, for example, is external to the ingestion module 22), and is not intended to be limiting. For this reason, there is an additional broken lined box surrounding the landing zone 20 and the processed database 26.

The ingestion pipeline 44 receives data files stored within the landing zone 20. In example embodiments, the ingestion pipeline 44 is implemented within a data factory environment of the computing resources 8.

The ingestion pipeline 44 can communicate with the template repository 47 to assign or ingest data files.

The template repository 47 can store one or more template files 46 (hereinafter referred to in the singular, for ease of reference) that can be used to identify parameters of the data file being ingested, or for ingestion of the data file. For example, the one or more template files can include an Internet Database Connector (IDC) template file 46 used by the ingestion pipeline 44 to determine the type of file being ingested, the originating location of the data file, processing patterns or parameters applicable to files correlated to the IDC template file 46, associated configuration files 23, etc. Continuing the example, if the data file being ingested correlates to certain specified criteria within a particular IDC template file 46, the ingestion pipeline 44 determines that the data file being ingested is processed in accordance with the template file 46.

In example embodiments, the template file 46 provides the format that the data file being ingested is expected to be stored in the computing resources 8 (e.g., the template file 46 identifies that the data file being ingested includes a set of customer addresses and directs the ingestion pipeline 44 to a configuration file 23 for formatting customer address files). In example embodiments, the template file 46 can include an IDC file which stores the format that the data file being ingested is stored on the on-premises system (e.g., the template file 46 stores the original format of the data file, for redundancy).

The ingestion pipeline 44 provides the data file to the ingestor 50 for processing. In example embodiments, the ingestion pipeline 44 provides the ingestor 50 with at least some parameters from the template file 46. For example, the ingestion pipeline 44 can provide the ingestor 50 with extracted properties of the data file in a standardized format (e.g., the data file has X number of entries, etc.).

The ingestor 50 processes the received data file based on an associated configuration file 23. In example embodiments, the ingestion pipeline 44 can provide the ingestor 50 with the location of an associated configuration file 23 for processing the data being ingested. The ingestion pipeline 44 can determine a subset of configuration files 23, and the ingestor 50 can determine the associated configuration file 23 based on the provided subset. In other example embodiments, the ingestor 50 solely determines the associated configuration file 23 based on the data file, and possibly based on information provided by the ingestion pipeline 44, if any. In example embodiments, the ingestion pipeline 44 can retrieve the associated configuration file 23 and provide the ingestor 50 with same.

The ingestor 50 retrieves the configuration file 23 from a metadata repository 25 having a plurality of configuration files 23. The metadata repository 25 includes various configuration files 23 having various configuration parameters for processing data files. Each configuration file 23 can be associated with a particular data file, or a group of related data files (e.g., a configuration file 23 can be related to a stream of data files originating from an application). The configuration parameters can be in the form of a JavaScript Object Notation (JSON) configuration file 23.

The configuration file 23 can include parsing parameters, and mapping parameters. The parsing parameters can be used by the ingestor 50 to find data within the data file, or more generally to navigate and identify features or entries within the data file. The parsing parameters of the configuration file 23 can define rules an ingestor 50 uses to categorize the data file being ingested. Particularizing the example, the configuration file 23 can specify one or more parameters to identify a type of data, such as an XML file, an XSL Transformation (XSLT) or XML Schema Definition (XSD) file, etc., by, for example, parsing syntax within the received data file. In at least some embodiments, the configuration parameters can specify a type of data with greater particularly. For example, the configuration parameters, can specify that the data is transactional data related to stock trades which are typically in a particular format.

It is contemplated that the configuration file 23 can facilitate identification of the ingested data in a variety of ways, such as allowing for the comparison of data formats, metadata or labelling data associated with the data, value ranges, etc. of the ingested data with one or more predefined categories.

In at least some contemplated example embodiments, the parsing parameters of the configuration file 23 include one or more filtering parameters. The filtering parameters can specify which data within the data file is to be ingested into the remote computing environment 24 (e.g., a Cobol record filter for filtering certain string expressions). For example, the filtering parameter can specify that certain values within a data entry are not to be ingested (e.g., nonce characters at the beginning of a document, or file IDs specific to legacy on premises systems). In at least one example embodiment, the filtering parameters identify data entries which are dependent entries not to be ingested (e.g., variable linked entries or files are excluded).

The parsing parameters can also include parameters to facilitate extraction or manipulation of data entries into the format of the computing environment 24. For example, an example configuration file 23 can include parameters for identifying or determining information within a data file, such as the header/trailer, field delimiter, field name, etc. These parameters can allow the ingestor 50 to effectively parse through the data file to find data for manipulation into the standardized format, for example (e.g., field delimiters are changed).

The parsing parameters can include parameters to identify whether the data file is an incremental data file, or a complete data file. For example, where the data file is a daily snapshot of a particular on premises database (alternatively referred to as an iterative file), the parameters can define that the ingestor 50 should include processes to avoid storing redundant data. In the instance of the data file being a complete data file (alternatively referred to as a new file), the ingestor 50 can be configured to employ less demanding or thorough means to determine redundant data, if at all.

The mapping parameters can include one or more parameters associated with storing parsed data from the data file. For example, the mapping parameters can specify a location within the computing environment 24 into which the data file will be ingested. For example, the configuration file 23 can include or define the table name, schema, etc., used to identify the destination of the data file. The mapping parameters can define one or more validation parameters. For example, the mapping parameters can identify that each record has a record count property that must be validated.

The mapping parameters can include parameters defining a processing pattern for the data file. For example, the mapping parameters can allow the ingestor 50 to identify or determine file properties or types (e.g., different data sets can be stored using different file properties) and parameters defining how to process the identified file property type (e.g., copy books for mainframe files, etc.).

The ingestor 50 can be responsible for generating the configuration file 23. The configuration file 23 can be generated based on the template file 46 stored in the template repository 47 (e.g., upon receiving the template file 46 from the ingestion pipeline 44, or upon retrieving the template file 46 from template repository 47, etc.). For example, in instances where there is no associated configuration file 23 within the metadata repository 25, ingestor 50 can generated a configuration file 23 based on the template file 46 associated with the data being ingested. In at least some contemplated example embodiments, the ingestion pipeline 44 can retrieve associated template files 46 from template repository 47 and transmit same to the ingestor 50.

The ingestor 50 can generate the configuration file 23 based on the template files 46, or based on the template file 46 and data received from a user interface for processing metadata to create configuration files 23.

In some example embodiments, the processing of the received data file based on an associated configuration file 23, including the data categorization described in the preceding section, is performed by one or more of, or some combination of, the processor 52, the validator 54, and the writer 56, and not solely the ingestor 50.

The validator 54 can be configured, based on metadata 25 or the configuration template 46, to identify whether the ingested data is valid. Validation can be performed with different approaches. For example, the metadata may be validated, the entries of the data being ingested may be validated, and so forth.

The writer 56 is configured to write or transmit data to the remote computing environment 24, shown in FIG. 3 as including a current representation of a data set 58, an invalid representation of a dataset 62 (e.g., a representation including all invalid entries which were attempted to be added to the data set), and a previous representation of a data set 60

(in the alternative, and for ease of reference, collectively referred to as the "data representations", or individually as representations).

The delineation between data representations may be preconfigured in the computing environment 8. For example, the data may already be partitioned between the current, previous, and invalid representations, or a process can be used to delineate the data into the respective representations. The process of delineation can be performed on the on-premises device 4, on the computing environment 8, 24 (e.g., the partitioning may be performed via the writer 56, or the ingestor 50), and so forth. In at least some example embodiments, the writer 56 complements or communicates with an existing infrastructure for delimiting between data representations on the remote computing environment 24 (e.g., the writer 56 utilizes functionality available on the Azure™ platform).

Figure 4A:
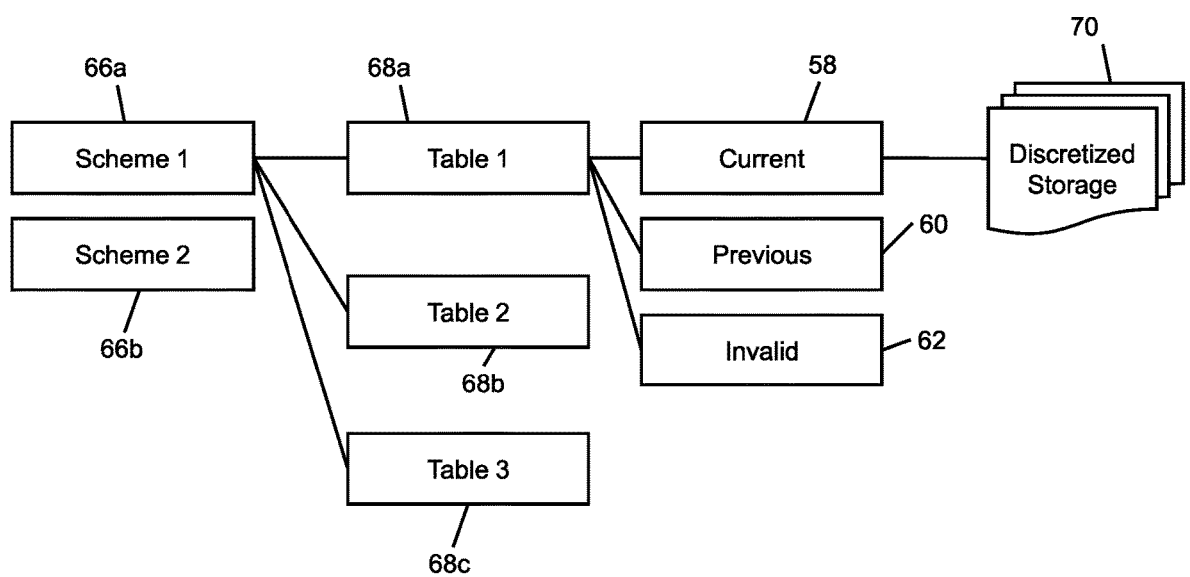
FIG. 4A is a block diagram of an example storage process for transmitting local data to a remote computing environment.
Figure 4B:
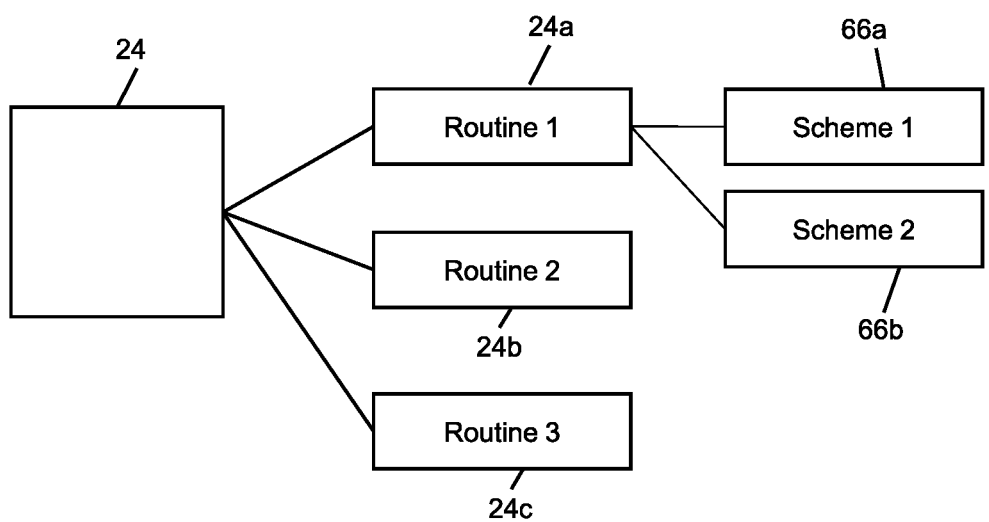
FIG. 4B is a block diagram of another example storage process for transmitting local data to a remote computing environment.

FIG. 4A shows a schematic diagram of an example storage strategy which includes the writer 56.

In at least some contemplated example embodiments, data within the computing environment 8, 24 can be stored according to a topology that involves schemas 66, tables 68, data representations, and storage 70, which storage 70 can include discretized storage where the data being ingested is partitioned (e.g., the current representation is further partitioned, and each partition is possibly stored separately), and possibly stored in different physical locations.

Data being ingested can be required to conform to at least one of a plurality of schemas 66 (e.g., schemas 66a, and 66b). For example, where is determined that the data being ingested data is consumer data, the data being ingested may be assessed or identified as being related to schema 66a in the computing environment 24. In at least some example embodiments, the schema 66 can be defined by the configuration file 23. The schema 66a can, for example, specify an expected format (e.g., expected column amounts, value types such as integers or characters, encryption protocols, etc.).

Within a schema 66, data being ingested can further be categorized as belonging to a particular table 68. For example, based on address information located within the consumer data being ingested, it can be determined that the consumer data relates to consumers of a particular state (e.g., California), and that table 68a of schema 66a is the appropriate location to store the data being ingested as it stores all Californian consumer data. In another example, the particular table 68a can simply be one discretized portion of the collective table 68 that adheres to the specific schema 66a.

Once the correct table 66 is determined for the data being ingested, a determination can be made as to whether the ingested data is to be stored in the current representation 58, the previous representation 60, or the invalid representation 62. Any data which is being stored in the current representation 58 can be stored in storage 70.

It is understood that the bounds of the different schemas 66 and table 68 can change or evolve over time. For example, new schemas can be added to the plurality of schema 66 as needs change.

Existing schemas 66 can be updated to capture changes. For example, where new regulatory requirement requires a particular type of encryption, a schema 66 can be updated to reflect the new encryption requirement. In another example, the number of columns in a table 68 can be updated where data being ingested conforms with the schema 66 that indicates that new columns (e.g., a customer data table is updated to include a new column as to whether a customer has opted into a communication as required by example legislation).

Table bounds can be changed as the volume of data increases. For example, a table 66a may be limited to include only 1,000 entries, sorted alphabetically. As the volume of data stored increases, the table 66a size can increase, the delimiters between tables 66 can change (e.g., the tables are now bound by different times, as compared to alphabetic records), and so forth.

In at least some example embodiments, the writer 56 or processor 52 determines or identifies which schema 66, table 68, and/or data representation data being ingested should be associated with based on the configuration file 23. For example, the writer 56 may determine the appropriate table 68 for the data being ingested (e.g., table 68a). The writer 56 can send the data being ingested to a routine 24a it determines is responsible for the updating or manipulating the determined table. In some embodiments, different routines 24a-24n handle different types of uploading. For example, a routine 24a can be used to update US consumer information, and the writer 56 can send the data to be ingested to the routine 24a.

Figure 5:
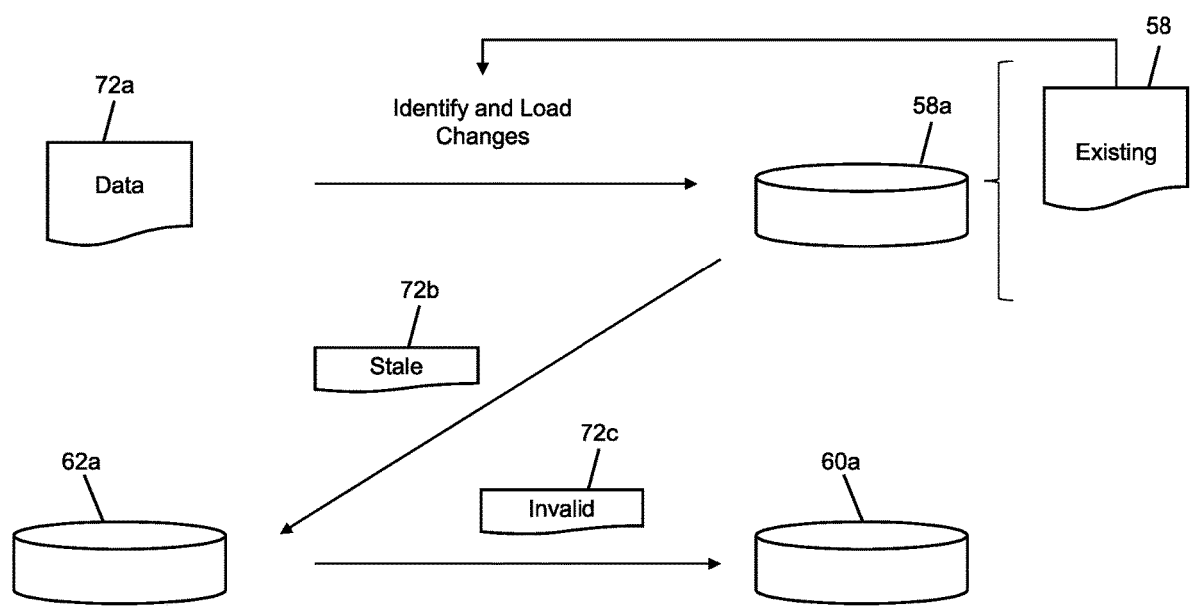
FIG. 5 is a diagram of an example method for uploading data into the remote (e.g., cloud-based) computing environment.

FIG. 5 shows a schematic diagram of an example method for uploading data into the remote (e.g., cloud-based) computing environment.

A request is received to load a new data set 72a to the remote computing environment 8, generally, or to the remote computing environment 24, specifically. For example, the request may be received from a device 4bb on the enterprise system 6.

One or more changes to a current representation of the data set, shown as current data set 58 (hereinafter interchangeably referred to as the current representation) within a database 58a for storing current representations of data sets, are identified within the new data set 72a. For example, the writer 56 may access or otherwise retrieve the current representation and compare the retrieved current representation to the new data set 72a. In another example, the writer 56, or another application, may compare the current representation and the new data set 72a within the computing environment 24.

The identified one or more changes within the new data set 72a are transmitted to the database 58a where the current representation is stored, and incorporated into the current representation. Incorporating the one or more changes can include replacing information within the current representation (e.g., a new transaction, reflecting new ownership of an asset, replaces an old record of a prior transaction establishing the previous owner), adding new information (e.g., adding an additional parameter representing existing data. For example, a new column can be added to transactional data to indicate how the asset is treated for the purposes of capital requirements associated with financial regulations), or adding new entries (e.g., information about a new customer is stored), etc.

Data within the new data set 72a that is not a change (i.e., unchanged data) can be dropped or ignored. In this way, the total amount of data required to be stored, or processed and transmitted within or by the remote computing environment 8 may be decreased.

Information replaced by the incorporation of the new information (i.e., the replaced information) can thereafter be transmitted to the previous representation of the data set stored in a database 60a for storing previous representations (hereinafter referred to simply as the previous representation 60, for ease of reference).

As with the one or more changes replacing certain information, any information which is replaced within the previous representation 60 by the replaced information displaced by the one or more changes can thereafter be transmitted to an associated invalid database 62*a* for storing invalid entries, or invalid representations of the data set (hereinafter referred to simply as the invalid representation 62, for ease of reference).

In some example embodiments, information from the previous representation 60 is not provided to the invalid representation 62; rather, the invalid representation 62 stores data which is not compliant with the schema 66 associated with the data table in issue. For example, data added to the invalid representation 62 can include data that does not comply with the required format, includes blank or other similar types of meaningless or unexpected values in certain dimensions, or does not comply with one or more validation parameters.

In example embodiments, the new data set 72*a* is a "snapshot" data set, reflecting the state of a data set in a particular moment in time. Snapshots of data sets can have the advantage of facilitating easily sequential ingestion owing to their temporal nature. For example, snapshots can be quickly processed for records which have not been changed since a prior update of the current representation.

Moreover, where the new data set 72*a* is a snapshot data set, at least some parallel computing can be implemented to determine the one or more changes. For example, snapshot data files may be compartmentalized in a regime provided by the configuration file 23 or the template file 46, and similar regions of the current representation can be compared to the new data set 72*a* on different computing platforms in order to determine the one or more changes. Further particularizing the example, the current representation can be divided into different temporal ranges (e.g., April and May, June, and July entries, etc.) and the snapshot data can similarly be subdivided into temporal ranges to facilitate a comparison for any changes.

In at least some example embodiments, the disclosed structure herein allows the stitching together and distinct types of data to create a new storage schema.

Figure 6:
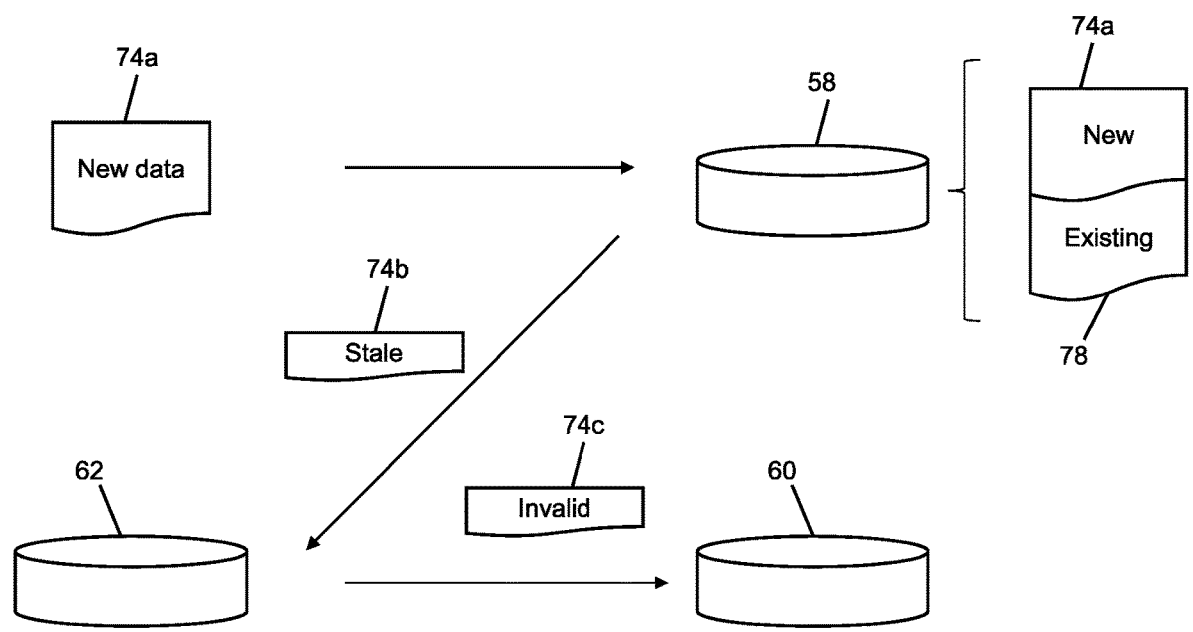
FIG. 6 is a diagram of another example method for uploading data into the remote (e.g., cloud-based) computing environment.

Referring now to FIG. 6, a schematic diagram of another example method of uploading data to a remote computing environment 24 is shown.

Similar to FIG. 5, a request is received to load a new data set 74*a* onto the remote computing environment 24.

In FIG. 6, the request includes one or more parameters identifying the that the new data set 74*a* seeks to add a new dimension to the current representation 58. For example, the new data set 74*a* may be adding a new column to the current representation indicating whether certain regulatory requirements have been complied with. The parameters may further specify how the new dimension is being added to the current representation 58. For example, the parameters may specify a location within the data set of the new dimension (e.g., the new dimension is intended to be the fifth column).

The parameters can also provide information to update the configuration parameters stored in the configuration file 23 associated with the data set, or the schema 66 associated with the data set, or an indication that the data set is being migrated to a new schema 66. For example, the parameters can update the configuration parameters in configuration file 23 and/or the template file 46 used to define the schema 66, to specify an expected range of values for the new dimension.

In at least some example embodiments, the parameters in the new data set 74*a* specify a schema change for the existing schema 66, and the current representation and/or the associated configuration file 23 and/or template file 46 are updated to adhere to the new schema without generating a new version of the data set. For example, where the new dimension (e.g., a new column) is added to the current representation (shown in FIG. 6 by the existing current representation 78 with the appended new data 74*a*), previous rows in the current representation can be updated to include a blank value for the newly added dimension, or the previous rows in the current representation may be reprocessed or revised to retrieve values of the new dimension for all existing rows in the current representation. As the previous representation 60 stores the data set as it existed before the addition of the new dimension, there is no need for a new version of the current representation.

The addition of the new dimension to the current representation can also trigger a revision or reprocessing of the previous representation 60. For example, the writer 56 may transmit a request to the enterprise system 6 for information to populate the previous representation with the new dimension.

The new data 74*a* is at least in part appended or incorporated into the current representation 58. In the embodiment shown in FIG. 6, the new data 74*a* is appended to the existing current representation 78 of the data set.

The new data 74*a* may not be exclusively new data. For example, the new data 74*a* can include some stale data 74*b*. Similarly, the introduction of the new data 74*a* into the current representation 78 can render some of the data in the current representation 78 stale.

The stale data 74*b* (whether from the existing current representation 78 or from the new data 74*a*) can be transferred or transmitted to the previous representation 60. Similar to the new data 74*a*, the stale data 74*b* can be appended or incorporated into the previous representation 60.

Invalid data in the new data 74*a* can, similar to processes described herein, be transmitted to the invalid representation 62.

In at least some example embodiments, the new data set 74*a* is a "delta" data set, which includes only changes to the current representation. The new data set 74*a* can be generated by the on-premises device 4 (or system related thereto) with data determined to be new to the current representation 58 (e.g., an on premises device 4 sends an update to an earlier data file that was ingested). So called delta data sets can be useful to reduce the amount of data being transferred and stored in the remote computing environment 24.

Figure 7:
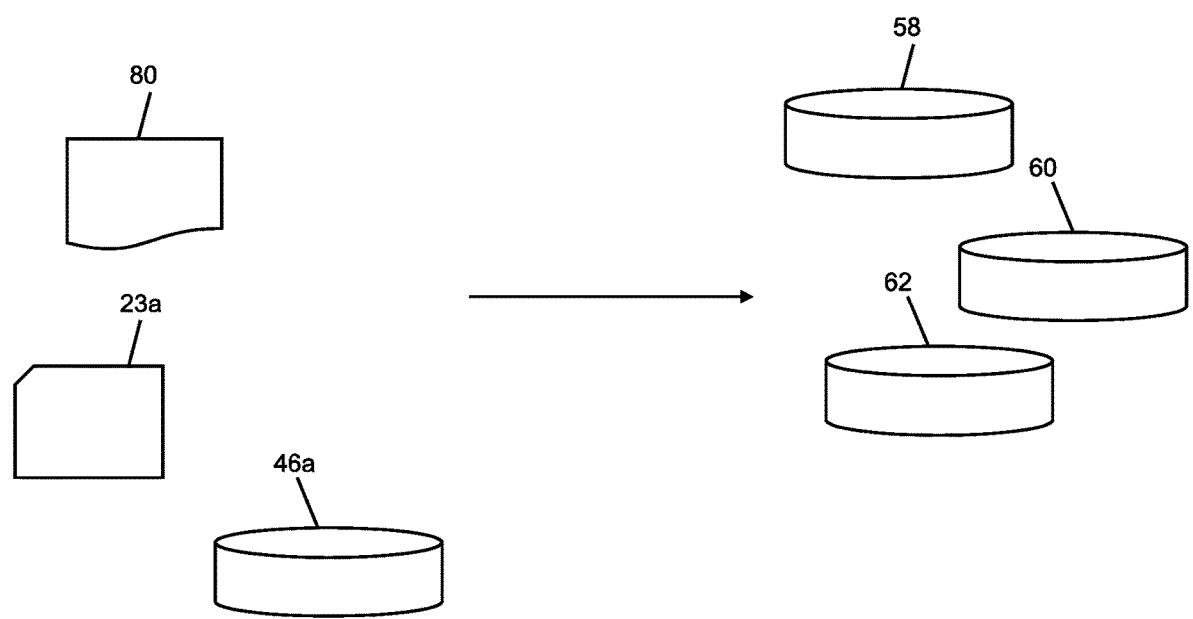
FIG. 7 is a diagram of yet another example method for uploading data into the remote (e.g., cloud-based) computing environment.

Referring now to FIG. 7, a diagram of yet another example method of uploading data to a remote computing environment 24 is shown.

Similar to FIG. 5, a request is received to load a new data set 80 onto the remote computing environment 24. The new data 80 can be data that has no associated configuration file 23 or the template file 46. As a result, the request can include a configuration file 23*a* for associating with data which subsequently updates the new data 80, and a template file 46*a* with which the new data 80 (and data associated with the new data 80) will comply with in order to be standardized for storage on the remote computing environment 24.

The request, with the new data 80, the configuration file 23*a*, and the template file 46*a*, can be used to generate the current representation 58 for the new data 80. Any invalid data within the new data 80 can be used to generate the invalid representation 62. In at least some example embodiments, the new data 80 includes historical data, or triggers the ingestion module 22 to retrieve historical data associated with the new data 80 from the on-premises location to generate a previous representation 60.

As discussed herein, the template file 46 or the configuration file 23 associated with data being uploaded to the remote computing environment 24 can be used to standardize the data prior to uploading. For example, the template file 46 or the configuration file 23 can specify a mapping from the data format of the data on-premises (e.g., a native, legacy format) to the standardized data format used in the remote computing environment 24. In example embodiments, the template file 46 or the configuration file 23 is defined in part by the requirements of the remote computing environment 24. For example, the provider of the remote computing environment 24 can include applications that interact with a particular format of data (e.g., Delta Lake compatible data formats), and the configuration file 23 can be configured to comply with the remote computing environment 24 format.

Over time, the template file 46 or the configuration file 23 can be changed to align with changes to the schema 66 or otherwise. For example, the configuration file 23 can be changed to use a different representation of the same data, such as changing the format of dates (e.g., from mm/dd/yyyy to dd/mm/yyyy), etc.

In example embodiments, the current representation 58, the previous representation 60, and the invalid representation 62 can all be stored in different remote computing environments representing different storage layers. For example, the current representation 58 can be stored on a "hot" storage layer, the previous representation 60 can be stored on a "cold" storage layer, and the invalid representation 62 can be stored on an "archive" or "frozen" storage layer. Cooler layers can possibly be more difficult to access or require a greater amount of time before access can be provided (e.g., the current representation 58 may be stored on data storage 70 that is available instantly to the device 4, whereas the invalid representation 62 may be stored in a data storage on the other side of the planet, introducing latency).

Figure 8:
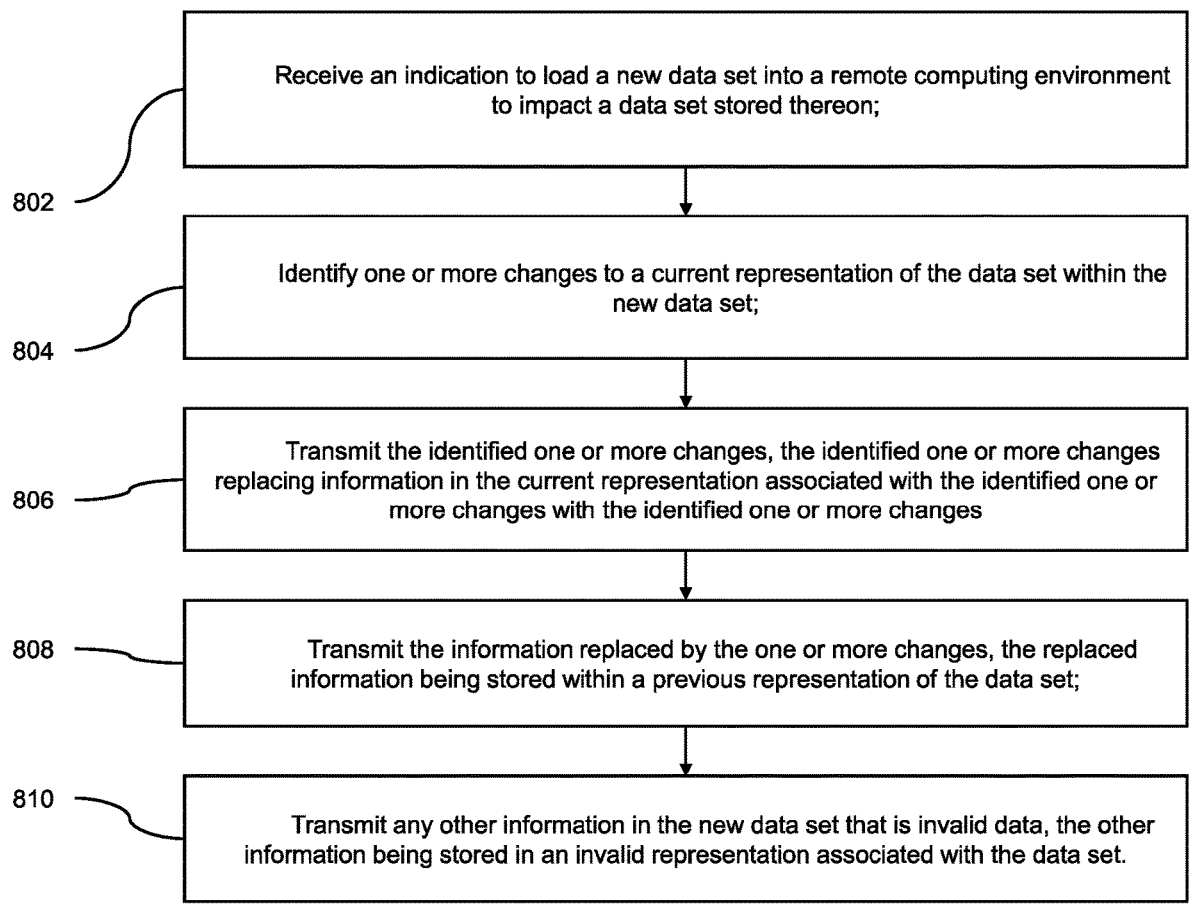
FIG. 8 is a flow diagram of an example embodiment of computer executable instructions for uploading data to a remote computing environment.

FIG. 8 is a flow diagram of an example embodiment of computer executable instructions for uploading data to a remote computing environment.

At block 802, an indication to load a new data set into a remote computing environment to impact the data set stored thereon is received. In example embodiments, the indication is a request, or in example embodiments the indication can be the detection of the new data set in a location designated for uploading to the remote computing environment 8.

At block 804, one or more changes to a current representation of the data set, within the new data set received in response to block 802, are identified. In example embodiments, the changes can be identified by a first computing environment, whereas the new data is requested to be stored in a second computing environment. Further particularizing the example, the first computing environment can be a first remote computing environment (e.g., a Microsoft™ Azure™ Data Factory), and the second computing environment can be a second computing environment (e.g., Microsoft™ Azure™ Storage Account) within the overall remote computing environment (e.g., Microsoft™ Azure™ Cloud). In yet another example embodiment, at least part of the process of identifying the changes occurs on other than the remote computing environment 8. For example, where the new data is a delta data set, at least part of the process of identifying changes can occur on an on-premises computing environment (e.g., enterprise system 6).

The changes can be identified in a variety of manners. For example, data entries or rows read from the source file (e.g., data file 74*a*) is compared to the data in the current representation to identify the changes based on changes to row hash values, or primary key hash values, if provided.

At block 806, the one or more changes are transmitted to update the current representation of, with the data set. For example, the changes may be transmitted from a first remote computing environment (e.g., a Microsoft™ Azure™ Data Factory), to the second computing environment (e.g., Microsoft™ Azure™ Storage Account). The changes can be transmitted to one or more remote or on-premises computing environments controlling a database storing at least part of the current representation of the data set. For example, the current representation may be discretized and stored on various computing environments in a cloud computing environment.

At block 808, information previously within the current representation, which has been replaced by the one or more changes (hereinafter the replaced information) is transmitted to update the previous representation. For example, the replaced information may be transmitted from a first remote computing environment (e.g., a Microsoft™ Azure™ Data Factory), to the second computing environment (e.g., Microsoft™ Azure™ Storage Account). The replaced information can be transmitted to one or more remote or on-premises computing environments controlling a database storing at least part of the previous representation of the data set. For example, the previous representation may be discretized and stored on various computing environments in a cloud computing environment.

At block 810, any invalid information in the new data received the block 802 is transmitted to update an invalid data set associated with the data set being updated or created. Invalid data can include any data that did not load, including data with missing entries, nonsensical entries, entries not within an expected range, entries that do not satisfy certain formatting requirements, etc. In at least some example embodiments, the invalid data set also include information that has been replaced from the previous representation.

It is understood that sequences other than the sequences implied in FIG. 8 are contemplated. For example, invalid data may be determined at the same time as the one or more changes are identified, and as a result steps 804 and 810 can occur simultaneously.

Figure 9:
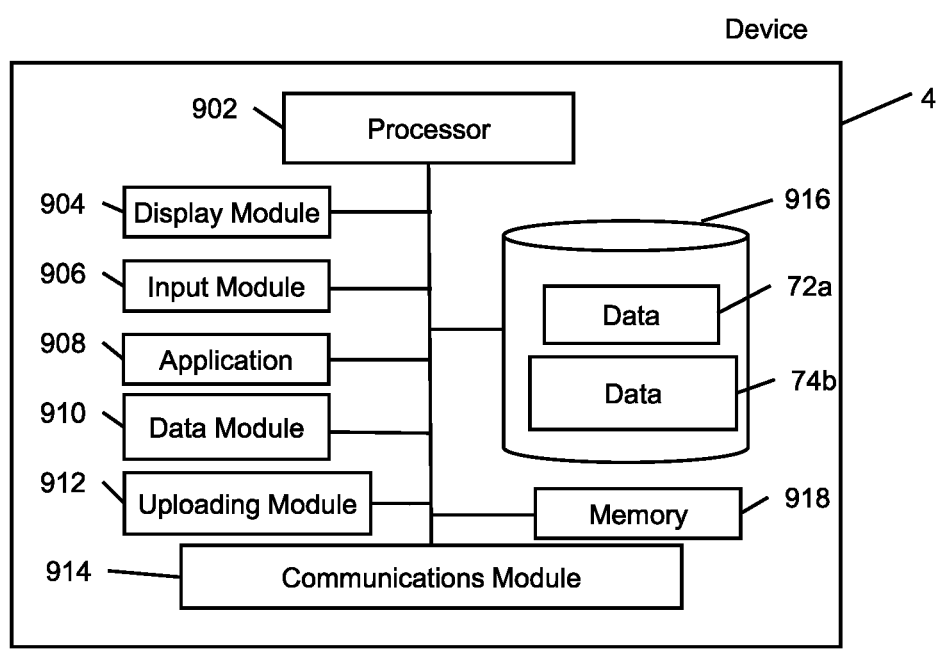
FIG. 9 is a block diagram of an example configuration of a device.

In FIG. 9, an example configuration of a device 4 is shown. It can be appreciated that the device 4 shown in FIG. 9 can correspond to an actual device or represent a simulation of such a device 4. The shown device 4 can be an internal device, or an external device. The device 4 can include one or more processors 902, a communications module 914, and a data store 916 storing data for uploading (e.g., the new data 72*a*, being a snapshot, or the new data 74*a* being a delta data set).

Communications module 914 enables the device 4 to communicate with one or more other components of the computing environment 2 via a bus or other communication network, such as the communication network 10. The device 4 includes at least one memory 918 or memory device that can include a tangible and non-transitory computer-readable medium having stored therein computer programs, sets of instructions, code, or data to be executed by processor 902. FIG. 9 separately illustrates examples of modules and applications stored in memory 918 on the device 4 and operated by the processor 902. It can be appreciated that any of the modules and applications shown in FIG. 9 may also be hosted externally and be available to the device 4, e.g., via the communications module 914.

In the example embodiment shown in FIG. 9, the device 4 includes a display module 904 for rendering GUIs and other visual outputs on a display device such as a display screen, and an input module 906 for processing user or other inputs received at the device 4, e.g., via a touchscreen, input button, transceiver, microphone, keyboard, etc. The device 4 may also include one or more applications (shown as the singular application 908) that generate data for uploading to a remote computing environment. The device 4 may include a data module 910 to format, identify, change, or otherwise manipulate data for uploading. For example, the data module 910 can be used to identify data related to the data being uploaded, e.g., related historical data. In another example, the data module 910 can be used to define and particularize configuration parameters for metadata 25 or configuration templates 46. The uploading module 912 enables the device 4 to interface with the remote computing environment 8, or a subset thereof, to transfer data to the remote computing environment 8. The data store 916 may be used to store data, such as, but not limited to, an IP address or a MAC address that uniquely identifies device 4. The data store 916 may also be used to store data ancillary to transmitting data to the computing environment 8, such as, but not limited to, login credentials, user preferences, cryptographic data (e.g., cryptographic keys), etc.

Figure 10:
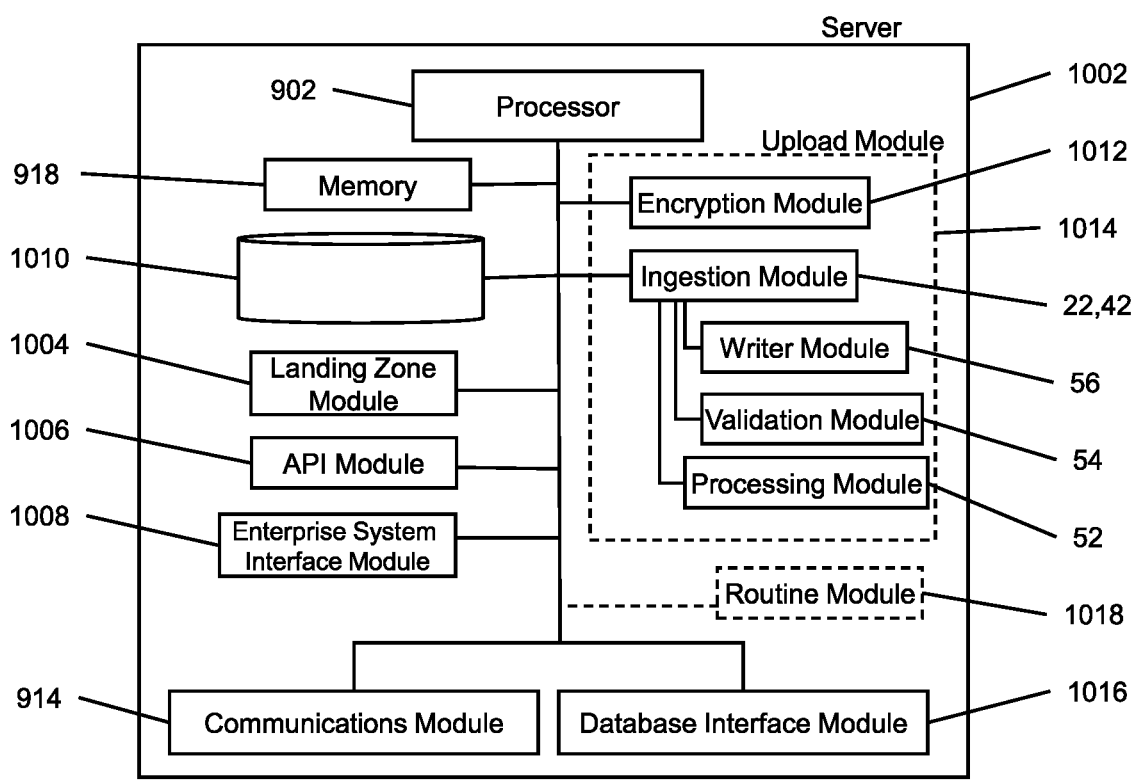
FIG. 10 is a block diagram of an example server of a remote computing environment.

Referring to FIG. 10, an example configuration of a server 1002 implementing the functionality of the remote computing environment 8 is shown. It can be appreciated that the server 1002 shown in FIG. 10 can correspond to an actual device, or represent a simulation of such a server 1002, or represent a configuration of multiple servers cooperating to provide the requisite functionality. The server 1002 can include one or more processors 902, a communications module 914, and a data store 1010 (e.g., for storing the configuration template 46, the metadata 25, and the data representations), and a database interface module 1016.

Communications module 914 enables the server 1002 to communicate with one or more other components of the remote computing environment 8 or the enterprise system 6 via a bus or other communication network, such as the communication network 10. The server 1002 includes at least one memory 918 or memory device that can include a tangible and non-transitory computer-readable medium having stored therein computer programs, sets of instructions, code, or data to be executed by processor 902. FIG. 10 separately illustrates examples of modules and applications stored in memory 918 on the server 1002 and operated by the processor 902. It can be appreciated that any of the modules and applications shown in FIG. 10 may also be hosted externally and be available to the server 1002, e.g., via the communications module 914.

In the example embodiment shown in FIG. 10, the server 1002 includes a landing zone module 1004 for either storing data between processing steps, e.g., for generating a temporary storage to implement the landing zone 16 and/or for implementing a scheduling application to move the data between landing zones and other modules (e.g., the push or pull applications, or the cloud administration application), an application programming interface (API) module 1006, for facilitating communication between the server device 1002 and other remote computing environments (e.g., example embodiments where the remote computing environment 24 is hosted externally to server 1002), or for facilitating communication between the server device 1002 and a device 4 (whether an internal or external device 4), or for facilitating communication between the server 1002 and a specific application, and so forth. The server 1002 may also include an enterprise system interface module 1008 whose sole purpose is to facilitate communication with the enterprise system 6. The server 1002 includes an upload module 1014 to process, ingest, identify, change, store, or otherwise manipulate data for transmission or for the purpose of storing the data. The upload module 1014 can include an encryption module 1012, and the ingestion module 22, 42, said ingestion modules 22, 42 including a writer module 56, a validation module 54, and a processing module 52. The encryption module 1012 can encrypt data in a variety of manners prior to the data representations being stored. In at least some example embodiments, the data being ingested is already encrypted, and the encryption module 1012, in cooperation with a complementary encryption module on the device 4 or on-premises (not shown), decrypts the data for ingestion so that any data transmitted between the premises and the remote computing environment 8 is encrypted.

The ingestion module 22, 42 ingest data as described herein. In example embodiments, at least some functionality of the ingestion module 22, 42 described herein is performed by a routine module 1018, which stores the routines 24a, 24b, and 24c used by the remote computing environment 24.

In terms of processing data, the writer module 56, or the processing module 52 can be used to identify whether data complies with a schema 66, or to take necessary steps to map the data being ingested into a format accepted by the data representations based on the configuration template 46.

The database interface module 1016 facilitates communication with databases used to store the ingested data. For example, the database interface module 1016 can be used to communicate with a database for "cold" storage to store the previous representation, which in the example embodiment is not stored on server 1002. The data store 1010 may be used to store data, such as, but not limited to, an IP address or a MAC address that uniquely identifies server 1002. The data store 1010 may also be used to store data ancillary to transmitting or receiving data within the computing environment 8, such as, but not limited to, login credentials, user preferences, cryptographic data (e.g., cryptographic keys), etc.

Figure 11:
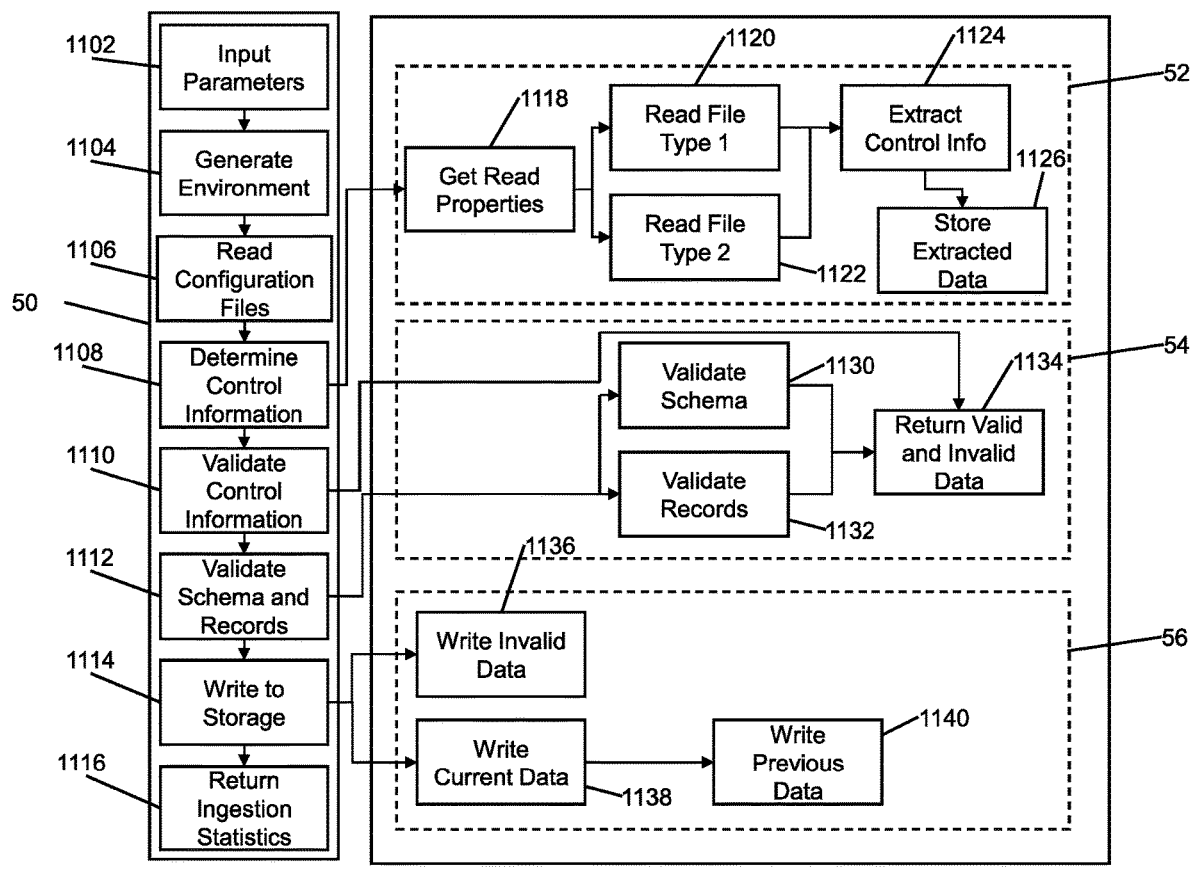
FIG. 11 is a flow diagram of an example method for ingesting a plurality of data files into a remote computing environment.

Referring now to FIG. 11, a flow diagram of an example method for ingesting a plurality of data files into a remote computing environment is illustrated. For ease of illustration, reference shall be made to elements of the preceding figures to discuss the example flow diagram. It is understood that such reference is not intended to be limiting.

At block 1102, the ingestor 50 receives the data file 74a and any associated parameters (e.g., information designating a server 1002, a template file 46, etc.).

At block 1104, the ingestor 50 generates the computing environment where the data file 74a will be processed. Generating the computing environment can include scheduling the use of the determined processor, storage capacity, etc.

At block 1106, the ingestor 50 reads or loads one or more configuration files 23 from the metadata repository 25. In example embodiments, the one or more configuration file 23 can represent a subset of all configuration files 23 stored on the metadata repository 25. For example, the subset can be a filtered subset based on parameters within the template file 46 associated with the data file 74a. Particularizing the example, the template file 46 can specify the source of the data file 74a, narrowing the plurality of configuration files 23 (e.g., a single configuration file 23) to the subset of configuration files 23 transmitted to the ingestor 50 based on association with the specific source and data file 74a. The configuration file(s) 23 can be loaded in closer proximity to the processor instantiating the ingestor 50 to reduce latency.

At block 1108, the ingestor 50 determines the validation parameters (e.g., control information) used to ingest the data file 74a.

As shown in block 1118, determining the control information to ingest the data file 74a can include retrieving any properties or tools required to read the data file 74a. In example embodiments, the properties are specified in the configuration file 23. In at least some example embodiments, the properties or tools are identified by the configuration file 23, and can be retrieved by the ingestor 50. The properties or tools can include, for example, Cobrix Libraries needed to process the data file 74a, or data identifying the delimiter using the delimiter file, etc.

Blocks 1120 and 1122 demonstrate an aspect of the modularity of the proposed framework. Each of block 1120 and 1122 define a path travelled by different file types. Block 1120 can represent an XML file type, whereas block 1122 can represent another file type.

At block 1124, the processor 52 extracts control information from the data file 74a.

At block 1126, the processor 52 stores extracted control information for use to validate the data file 74a. For example, the control information can be stored, possibly temporarily to avoid storage fees, in metadata repository 25 or template repository 47.

At block 1110, the extracted control information is used to validate the data file 74a.

At block 1112, the schema of the data file 74a and/or entries in the data file 74a are validated. For example, the validator 54 can determine whether entries are invalid (block 1132). In another example, the validator 54 can determine whether the data file 74a satisfies a schema (e.g., enforced by the remote computing environment 24) for storing data files remotely (block 1130). For example, the schema can specify that the data file 74a includes certain columns (e.g., entries requiring the completion of certain regulatory requirements), that entries in the data file 74a adhere to certain formats (e.g., date files are stored as mm/dd/yyyy) etc.

At block 1134, the data file 74a is parsed into validated and invalid data for subsequent writing into the computing environment 24. The data file 74a can be wholly invalid, or include entries which are invalid.

At block 1114, the data file 74a (assuming that it is validated) is written into the computing environment 24. As shown in blocks 1138 and 1136, the valid and invalid data can be written to separate destinations (e.g., as defined by the configuration file 23), a current representation of the data set and an invalid representation of the data set, respectively.

The ingestor 50 can determine, during the course of writing data pursuant to block 1136 or otherwise, that the data file 74a will displace or replace information in the current representation. For example, the data file 74a can update the ownership of a particular security. The ingestor 50 can be configured to write any displaced or replaced information into a previous representation of the data set in block 1140

At block 1116, the ingestor 50 transmits ingestion statistics (e.g., time to process the data file, number of entries found invalid, etc.), including tracking data, for storage. For example, the ingestion statistics and tracking data can be sent to the template repository 47 for storage.

Figure 12A:
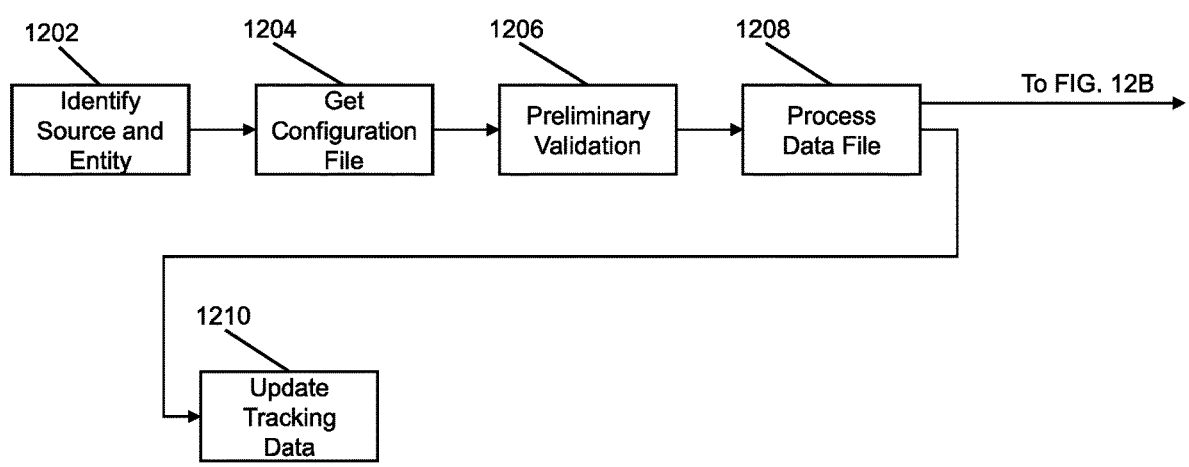
FIGS. 12A and 12B illustrate a flow diagram of another example method for ingesting a plurality of data files into a remote computing environment.
Figure 12B:
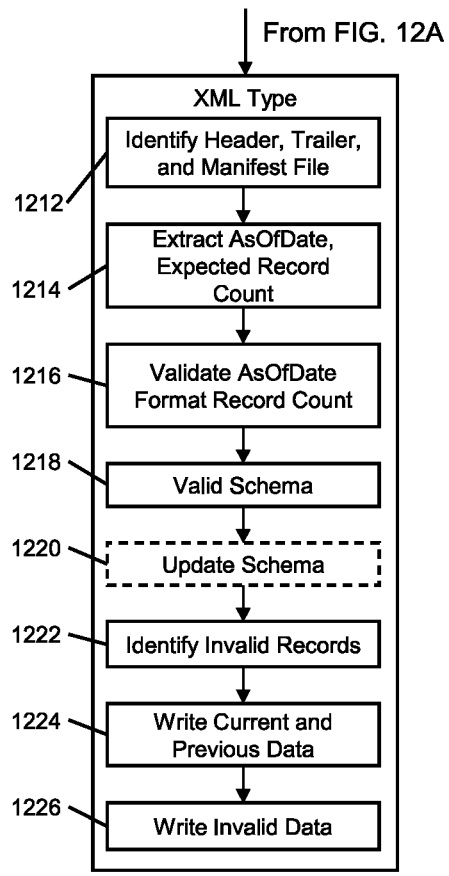

FIGS. 12A and 12B illustrate a flow diagram of another example method for ingesting a plurality of data files into a remote computing environment. For ease of illustration, reference shall be made to elements of the preceding figures to discuss the example flow diagram. It is understood that such reference is not intended to be limiting.

At block 1202, the source of the data file 74a (e.g., a particular computing resource of the enterprise system 6, such as server X) and the entity associated with the data file 74a (e.g., a subsidiary, or finance division of the enterprise system 6, etc.) are identified. In example embodiments, the source and entity are identified in the template file 46 by the ingestion pipeline 44, or the ingestor 50, or a combination thereof.

At block 1204, the configuration file 23 associated with the source and the entity is retrieved or transmitted to the ingestor 50. For example, the metadata repository 25 can allow for filtering the plurality of configuration files 23 by source and entity. This approach can advantageously require siloed data in on prem systems in order to integrate with the configuration file 23 based ingestion framework, which may reduce the risk associated with data being lost or inadvertently accessed.

At block 1206, the ingestor 50 performs a preliminary validation. The preliminary validation can include determining whether the configuration file 23 is the most up to date configuration file 23 associated with the data file 74a.

At block 1208, the ingestor 50 processes the data file 74a with the determined configuration file 23.

FIG. 12B illustrates example processing for an XML data file type. The example is understood to not be limiting, and other configuration files 23 for use to process other XML files in a different manner, or any other data file 74a type, are contemplated.

At block 1212, the configuration file 23 is used to identify a header and trailer in the data file 74a, and a manifest file. The identification of these features of the data file 74a can allow the ingestor 50 to identify entries, for example by reference to the identified elements (e.g., information following the header is an entry, etc.).

At block 1214, the data file 74a is parsed to identify control information including an AsOfDate property, identifying when the data file 74a was created, and an Expected Record Count property, identifying the number of entries in the data file 74a to be uploaded.

At block 1216, the properties identified in block 1214 are validated.

At block 1218, the ingestor 50 can validate that the schema which the data file 74a is required to comply with, is up to date. In example embodiments, the ingestor 50 determines whether the data file 74a complies with the schema.

Optionally, at block 1220, if the schema allows for updating, and the data file 74a proposes to update the data schema, the schema is updated.

By allowing the data file 74a to update the schema used to store the data set in the computing environment 24, the ingestion module 22, 42 can be responsive to changing circumstances. For example, the ingestion module 22, 42 can quickly adopt new schemas by processing a data file 74a to change the schema, instead of using a separate process to update schemas. This compartmentalization also avoids delays to configure the ingestion module 22, 42 to seek out new schemas.

At block 1222, the ingestor 50 identifies any invalid records within the data file 74a. The configuration file 23 can provide parameters to determine which records are invalid.

At block 1224, the ingestor 50 can write valid data within the data file 74a to a current representation of a data set associated with the data file 74a. Data which is displaced by the new data within the data file 74*a* can be written into a previous representation of the data file 74*a*.

Referring again to FIG. 12A, at block 1210, the ingestor 50 can update the tracking data to incorporate writing of the data file 74*a*.

It will be appreciated that only certain modules, applications, tools, and engines are shown in FIGS. 2, 3, 9 and 10 for ease of illustration and various other components would be provided and utilized by the device 4, enterprise system 6, and/or the remote computing environment 8, as is known in the art.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of any of the servers or other devices in the computing environment 2, or accessible or connectable thereto. Any application or module herein described may be implemented using computer readable/executable instructions that may be stored or otherwise held by such computer readable media.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A device for loading data into remote computing environments, the device comprising:
a processor;
a communications module coupled to the processor; and
a memory coupled to the processor, the memory storing computer executable instructions that when executed by the processor cause the processor to:
receive a request to load a new data set into a remote computing environment, the new data set impacting an existing data set stored in the remote computing environment;
receive the new data set in the remote computing environment;
determine a schema specifying formatting and identifying tables into which the new data set is to be stored;
use the schema to identify one or more changes to specific one of the tables in a current representation of the data set stored in the remote computing environment within the new data set by comparing the new data set to associated portions of the current representation, the identified one or more changes replacing information in the current representation associated with the identified one or more changes with the identified one or more changes;
transmit the identified one or more changes to a first data store persisting the current representation and apply the one or more changes to the current representation to change the replaced information;
drop or ignore unchanged data from the new data set to avoid processing the unchanged data in the remote computing environment;
transmit the replaced information to a second data store persisting a previous representation of the data set; and
transmit other information in the new data set that is determined, using the schema, to be invalid data, to a third data store persisting an invalid data set associated with the data set.

2. The device of claim 1, wherein the computer executable instructions cause the processor to:
extract an entry in the new data set corresponding to a new dimension to add to the existing data set in the remote computing environment; and
transmit the entry to the first data store persisting the current representation, the entry being stitched into the current representation of the data set.

3. The device of claim 2, wherein the request specifies a location of the new dimension within the existing data set.

4. The device of claim 1, wherein the computer executable instructions cause the processor to:
receive a schema change for the data set stored on the remote computing environment; and
update the current representation of the data set to adhere to the schema change without generating a new version of the current representation.

5. The device of claim 1, wherein the new data set is a snapshot data set.

6. The device of claim 1, wherein the new data set is standardized in the remote computing environment in accordance with a configuration file prior to being used to replace information in the current representation.

7. The device of claim 6, wherein the schema is identified from the configuration file.

8. The device of claim 1, wherein the data stores persisting the current representation, the previous representation, and the invalid data set are provided by a storage layer of the remote computing environment.

9. The device of claim 8, wherein the one or more changes are identified by the device, and the storage layer is hosted by another remote computing server.

10. The device of claim 1, wherein one or more changes are identified based on changes to row hash values, or primary key hash values.

11. The device of claim 1, wherein the current representation is persisted in the data store in different temporal based subsets.

12. The device of claim 1, wherein the request comprises a configuration file for associating subsequent data with the current representation, and a template file with which the subsequent data needs to comply.

13. A method for loading data into a remote computing environment, the method comprising:
- receiving a request to load a new data set into a remote computing environment, the new data set impacting an existing data set stored in the remote computing environment;
- receiving the new data set in the remote computing environment;
- determining a schema specifying formatting and identifying tables into which the new data set is to be stored;
- using the schema to identify one or more changes to specific one of the tables in a current representation of the data set stored in the remote computing environment within the new data set by comparing the new data set to associated portions of the current representation, the identified one or more changes replacing information in the current representation associated with the identified one or more changes with the identified one or more changes;
- transmitting the identified one or more changes to a first data store persisting the current representation and apply the one or more changes to the current representation to change the replaced information;
- dropping or ignoring unchanged data from the new data set to avoid processing the unchanged data in the remote computing environment;
- transmitting the replaced information to a second data store persisting a previous representation of the data set; and
- transmitting other information in the new data set that is determined, using the schema, to be invalid data, to a third data store persisting an invalid data set associated with the data set.

14. The method of claim 13, further comprising:
- extracting an entry in the new data set corresponding to a new dimension to add to the existing data set in the remote computing environment; and
- transmitting the entry to the first data store persisting the current representation, the entry being stitched into the current representation of the data set.

15. The method of claim 14, wherein the request specifies a location of the new dimension within the existing data set.

16. The method of claim 13, further comprising:
- receiving a schema change for the data set stored on the remote computing environment; and
- updating the current representation of the data set to adhere to the schema change without generating a new version of the current representation.

17. The method of claim 13, wherein the new data set is a snapshot data set.

18. The method of claim 13, wherein one or more changes are identified based on changes to row hash values, or primary key hash values.

19. The method of claim 13, wherein the new data set is standardized in the remote computing environment in accordance with a configuration file prior to being used to replace information in the current representation.

20. A non-transitory computer readable medium for loading data into a remote computing environment, the computer readable medium comprising computer executable instructions for:
- receiving a request to load a new data set into a remote computing environment, the new data set impacting an existing data set stored in the remote computing environment;
- receiving the new data set in the remote computing environment;
- determining a schema specifying formatting and identifying tables into which the new data set is to be stored;
- using the schema to identify one or more changes to specific one of the tables in a current representation of the data set stored in the remote computing environment within the new data set by comparing the new data set to associated portions of the current representation, the identified one or more changes replacing information in the current representation associated with the identified one or more changes with the identified one or more changes;
- transmitting the identified one or more changes to a first data store persisting the current representation and apply the one or more changes to the current representation to change the replaced information;
- dropping or ignoring unchanged data from the new data set to avoid processing the unchanged data in the remote computing environment;
- transmitting the replaced information to a second data store persisting a previous representation of the data set; and
- transmitting other information in the new data set that is determined, using the schema, to be invalid data, to a third data store persisting an invalid data set associated with the data set.

* * * * *